United States Patent [19]
Inoue

[11] Patent Number: 5,617,346
[45] Date of Patent: Apr. 1, 1997

[54] MULTIPLICATION DEVICE USING SEMICONDUCTOR MEMORY

[75] Inventor: Genichiro Inoue, Osaka, Japan

[73] Assignee: Matsushita Electric Industrial Co., Ltd., Osaka, Japan

[21] Appl. No.: 462,901

[22] Filed: Jun. 5, 1995

[30] Foreign Application Priority Data

Jun. 7, 1994 [JP] Japan .................... 6-125025

[51] Int. Cl.⁶ ...................................... G06F 7/52
[52] U.S. Cl. ........................... 364/757; 364/754
[58] Field of Search .................... 364/754, 755, 364/757, 724.16, 758, 759, 760

[56] References Cited

U.S. PATENT DOCUMENTS 5,117,385  5/1992  Gee ........................ 364/724.16
5,379,244  1/1995  Miyoshi ...................... 364/754

FOREIGN PATENT DOCUMENTS 62-38938  2/1987  Japan .
62-42231  2/1987  Japan .
62-47741  2/1987  Japan .

Primary Examiner—Paul P. Gordon
Assistant Examiner—Ronald E. Prass, Jr.
Attorney, Agent, or Firm—McDermott, Will & Emery

[57] ABSTRACT

The present invention discloses a multiplication device. A multiplicand X of eight bits and a multiplier Y of eight bits are input and a product P of sixteen bits is found from these multiplication factors. MULTIPLICAND X is divided into two parts, an upper-order part $X_U$ of four bits and a low-order part $X_L$ of four bits. MULTIPLIER Y is likewise divided into two parts, an upper-order part $Y_U$ of four bits and a low-order part $Y_L$ of four bits. Thereafter, four 8-bit partial products, i.e., $X_L \times Y_L$, $X_L \times Y_U$, $X_U \times Y_L$, and $X_U \times Y_U$ are computed one after another. These partial products are subjected to a digit place alignment addition operation, by an adder, to compute PRODUCT P. Computation of each of the partial products is implemented by performing addition of an approximate partial product AP retrieved by a 6-bit address from a 64-byte ROM, and a correction value H and a carry C generated by a correction value generator.

10 Claims, 4 Drawing Sheets

MULTIPLICATION DEVICE USING SEMICONDUCTOR MEMORY

BACKGROUND OF THE INVENTION

This invention relates generally to a multiplication device using a semiconductor memory, e.g., ROM (Read-Only Memory).

In a conventional multiplication device with a ROM (hereinafter called the first prior technique), products about all combinations of multiplicands and multipliers are stored in the ROM, and using a multiplicand and a multiplier given as an address a corresponding product is read from the ROM. For example, on the one hand, when finding a product P of eight bits from a multiplicand F of four bits and a multiplier G of four bits by means of the first prior technique, a ROM that is accessed by $2^4 \times 2^4 = 2^8$ addresses requires a storage capacity of $8 \times 2^8$ bits (i.e., 256 bytes). On the other hand, when finding PRODUCT P of sixteen bits from a multiplicand X of eight bits and a multiplier Y of eight bits, a ROM that is accessed by $2^8 \times 2^8 = 2^{16}$ addresses requires a storage capacity of $16 \times 2^{16}$ bits (i.e., $2^{17}$ bytes).

Japanese Pat. Appln., published under Pub. No. 62-38938, discloses a ROM multiplication device (hereinafter called the second prior art technique). At least one of the numeric of a multiplicand given and the numeric of a multiplier given is divided into a plurality of partial numerics, and partial products about all combinations of the partial numerics of the multiplicand and the partial numerics of the multiplier are read from the ROM, and by performing a digit place alignment addition operation of these partial products, to find a product of the multiplicand and the multiplier. In comparison with the first prior art technique, the ROM storage capacity is reduced to $\frac{1}{2}^9$ in the case of finding PRODUCT P of sixteen bits from MULTIPLICAND X of eight bits and MULTIPLIER Y of eight bits. More specifically, in accordance with the second prior art technique, 8-bit MULTIPLIER X is, as is expressed by the following formula (1), is divided into two parts, that is, a 4-bit upper-order part $X_U$ and a 4-bit low-order part $X_L$.

$$X = X_U \times 2^4 + X_L \tag{1}$$

Likewise 8-bit MULTIPLIER Y is, as is expressed by the following formula (2), is divided into two parts, that is, a 4-bit upper-order part $Y_U$ and a 4-bit low-order part $Y_L$.

$$Y = Y_U \times 2^4 + Y_L \tag{2}$$

Here, $P = X \times Y = X_U \times Y_U \times 2^8 + X_U \times Y_L \times 2^4 + X_L \times Y_U \times 2^4 + X_L \times Y_L$, which is the formula (3). Four 8-bit partial products, i.e., $X_U \times Y_U$, $X_U \times Y_L$, $X_L \times Y_U$, and $X_L \times Y_L$, are read out of the ROM, and a digit place alignment addition operation of these partial products is performed according to the formula (3), to calculate PRODUCT P. If a single ROM is accessed four times, then the storage capacity of such a ROM is $8 \times 2^4 \times 2^4$ bits, or $2^8 = 256$ bytes.

The first prior art technique has a simple configuration but represents the problem that it requires a large storage capacity. Additionally, for the case of the multiplication device incorporated into a floating-point arithmetic device, using a ROM with a less storage capacity is preferable to downsize multiplication devices.

The second prior art technique, when computing a product of a multiplicand of eight or more bits by a multiplier of eight or more bits, does not much contribute to reducing the ROM storage capacity.

SUMMARY OF THE INVENTION

Bearing in mind the above-noted problems with the prior art techniques, the present invention was made. Therefore it is a main object of the present invention to provide an improved multiplication device that uses a ROM of a much less storage capacity in comparison with the first and second prior art techniques.

In order to accomplish the object, the present invention provides an improved multiplication device. The present multiplication device, while retrieving an approximate product from a ROM without using part of bits of a given multiplicand and a given multiplier, generates a correction value on the basis of the aforesaid part, whereupon the retrieved approximate product and the generated correction value are subject to a synthetic addition operation, to find a true product of the multiplicand and the multiplier.

As a result of such arrangement, the ROM storage capacity can be reduced considerably in comparison with the prior art technique that stores true products in ROM.

Where at least one of the numeric of a given multiplicand and the numeric of a given multiplier is divided into a plurality of partial numerics, an approximate product and a correction value are subjected to a synthetic addition operation in each computing process of partial products.

DETAILED DESCRIPTION OF THE INVENTION

Preferred embodiments of the present invention are now described by making reference to the attached drawing figures.

FIRST MULTIPLICATION DEVICE

Figure 1:
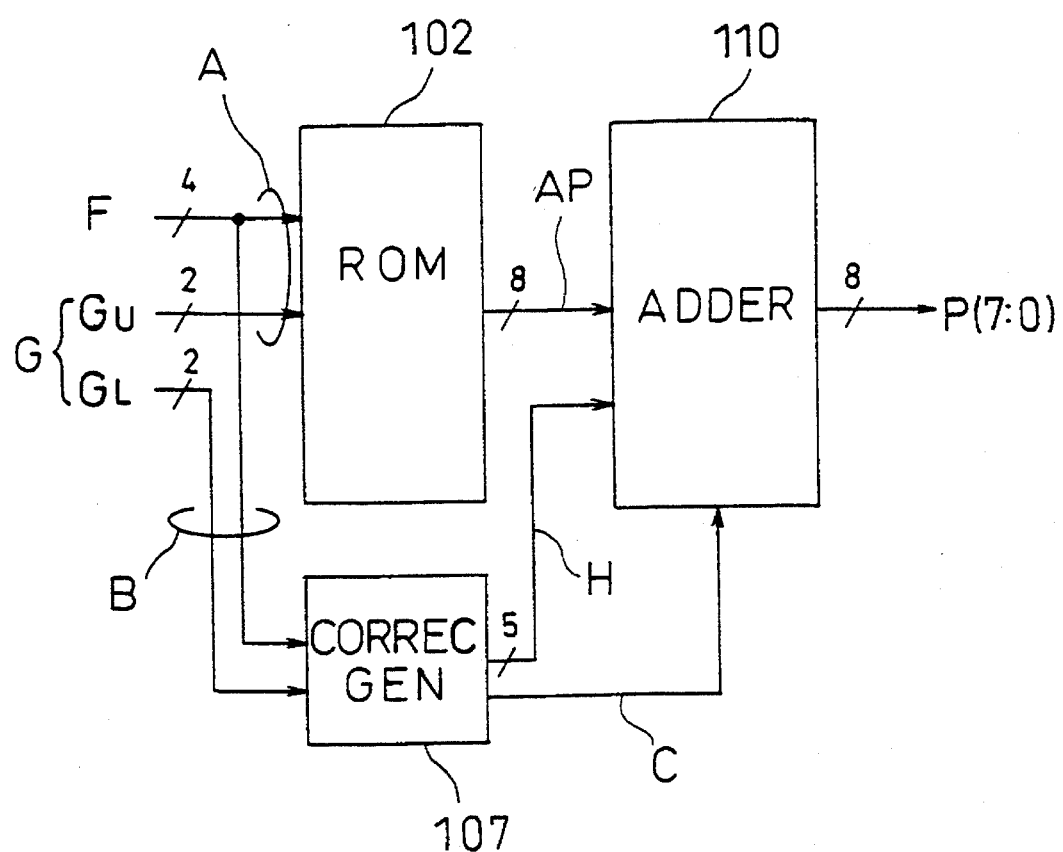
FIG. 1 illustrates a first multiplication device of the present invention.

FIG. 1 shows a first multiplication device for finding from a multiplicand F of four bits and a multiplier G of four bits a product P(7:0) of eight bits. The first multiplication device has a ROM 102, a generator 107 for generating a correction value, and an adder 110.

In the first multiplication device shown in FIG. 1, 4-bit MULTIPLIER G is divided into two parts as expressed in the following formula (4), i.e., a 2-bit upper-order part $G_U$ and a 2-bit low-order part $G_L$.

$$G = G_U \times 2^2 + G_L \tag{4}$$

MULTIPLICAND F and PART $G_U$ are supplied as an address A to the ROM 102. On the other hand, MULTIPLICAND F and PART $G_L$ are supplied as input data B to the generator 107.

Here, a formal multiplier G' and an approximate product AP are defined as follows.

$$G' = G_U \times 2^2 + 1 \tag{5}$$

$$AP=F \times G' \tag{6}$$

From the above:

$$AP=F \times G_U \times 2^2 + F \tag{7}$$

Meanwhile, a true product P is found as follows.

$$P=F \times G=F \times G_U \times 2^2 + F \times G_L \tag{8}$$

Therefore, a difference D between TRUE PRODUCT P and APPROX PRODUCT AP is as follows.

$$D=P-AP=F \times (G_L-1) \tag{9}$$

If, here, $G_L=3$ (11 in the binary notation), then $D=2 \times F$. If $G_L=2$ (10 in the binary notation), then $D=F$. If $G_L=1$ (01 in the binary notation), then $D=0$. If $G_L=0$ (00 in the binary notation), then $D=-F$. When APPROX PRODUCT AP and DIFFERENCE D are found, then TRUE PRODUCT P is found by the following formula (10).

$$P=AP+D \tag{10}$$

The ROM 102 has sixty-four APPROX PRODUCTS. With F (multiplicand) and $G_U$ (multiplier's upper-order part) serving as an address, a corresponding APPROX PRODUCT is retrieved from the ROM 102. The storage capacity of the ROM 102 that is accessed by $2^4 \times 2^2 = 2^6$ addresses is $8 \times 2^6$ bits, or $2^6=64$ bytes and thus is reduced to ¼ in comparison with the prior art technique.

The generator 107 generates from F (multiplicand) and $G_L$ (multiplier's low-order part) a correction value H of five bits and a carry C of one bit concurrently with the process of accessing to the ROM 102. If $G_L=3$, then $H=2 \times F$ and $C=0$. If $G_L=2$, then $H=F$ and $C=0$. If $G_L=1$, then $H=0$ and $C=0$. If $G_L=0$, then $H=INV (F)$ and $C=1$. INV (F) means a numeric resulting from inverting all the bits of F (i.e., one's complement of F). The generator 107 can be formed by a shifter capable of performing double operations and a plurality of inverters capable of the process of inverting of F.

The adder 110 performs a synthetic addition operation of AP (approx product) retrieved from the ROM 102 and H (correction value) generated by the generator 107 according to the formula (10), to compute P (product).

In accordance with the first multiplication device, the ROM storage capacity can be reduced to ¼ as compared with the first prior art technique, with a relatively simple configuration.

SECOND MULTIPLICATION DEVICE

Figure 2:
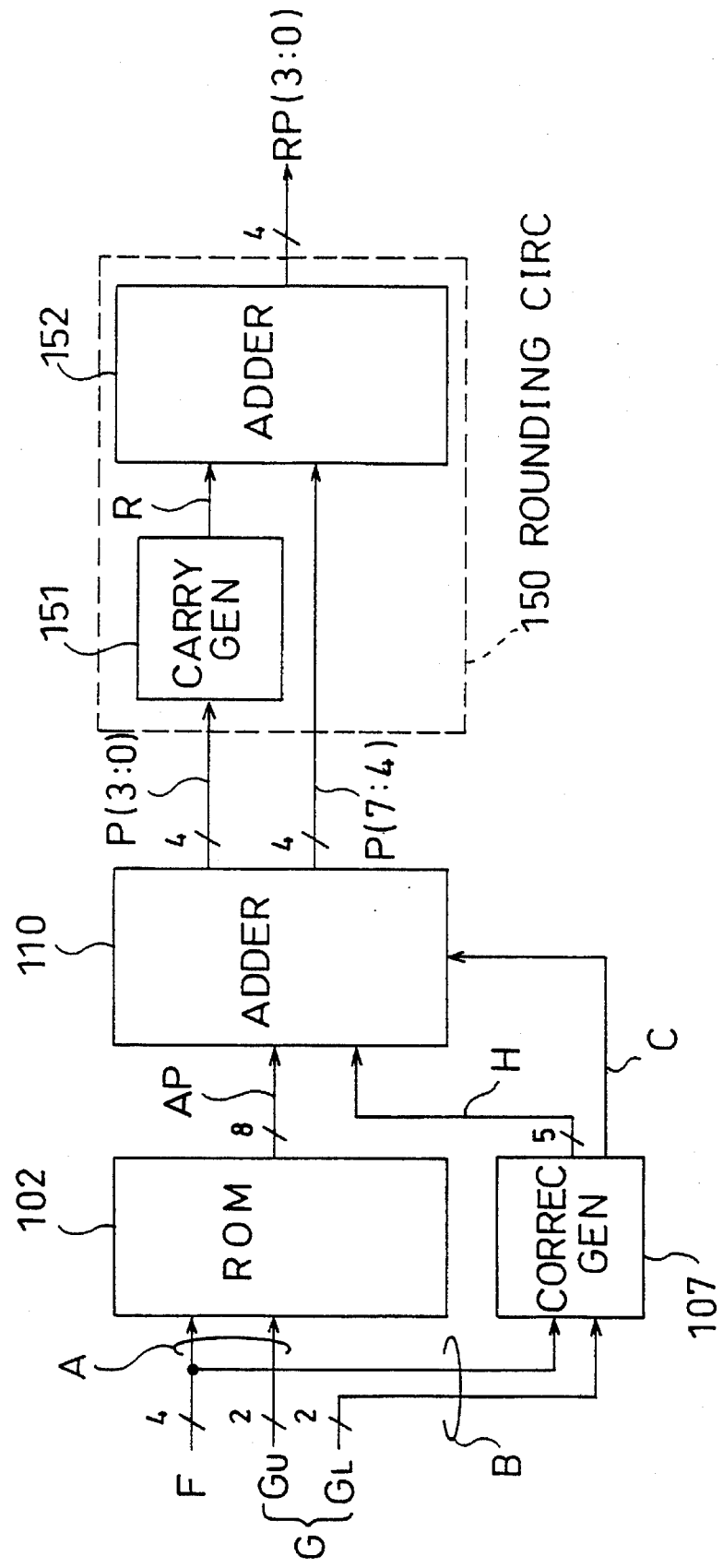
FIG. 2 illustrates a second multiplication device of the present invention.

FIG. 2 illustrates a second multiplication device of the present invention. The second multiplication device is one for finding from 4-bit MULTIPLICAND F and 4-bit MULTIPLIER G a rounding product RP(3:0). The second multiplication device is identical in organization with the First multiplication device except that the former further includes a rounding circuit 150. The rounding circuit 150 is made up of a generator 151 for generating a rounding carry and an adder 182. The generator 151 generates a rounding carry R from a 4-bit low-order part P(3:0) of PRODUCT P of eight bits from the adder 110. In the case of ROUNDING OFF, the MSB of P(3:0) acts as a carry R, while in the case of ROUNDING UP, a logical sum of the four bits forming P(3:0) acts as a carry R. The adder 152 computes RP (rounding product) by performing a rounding addition operation of a 4-bit upper-order part P(7:4) of PRODUCT P from the adder 110 and a generated rounding carry R. In the case of ROUNDING DOWN, the 4-bit upper-order part P(7:4) is RP. RP may be formed by a different number of bits other than four.

THIRD MULTIPLICATION DEVICE

Figure 3:
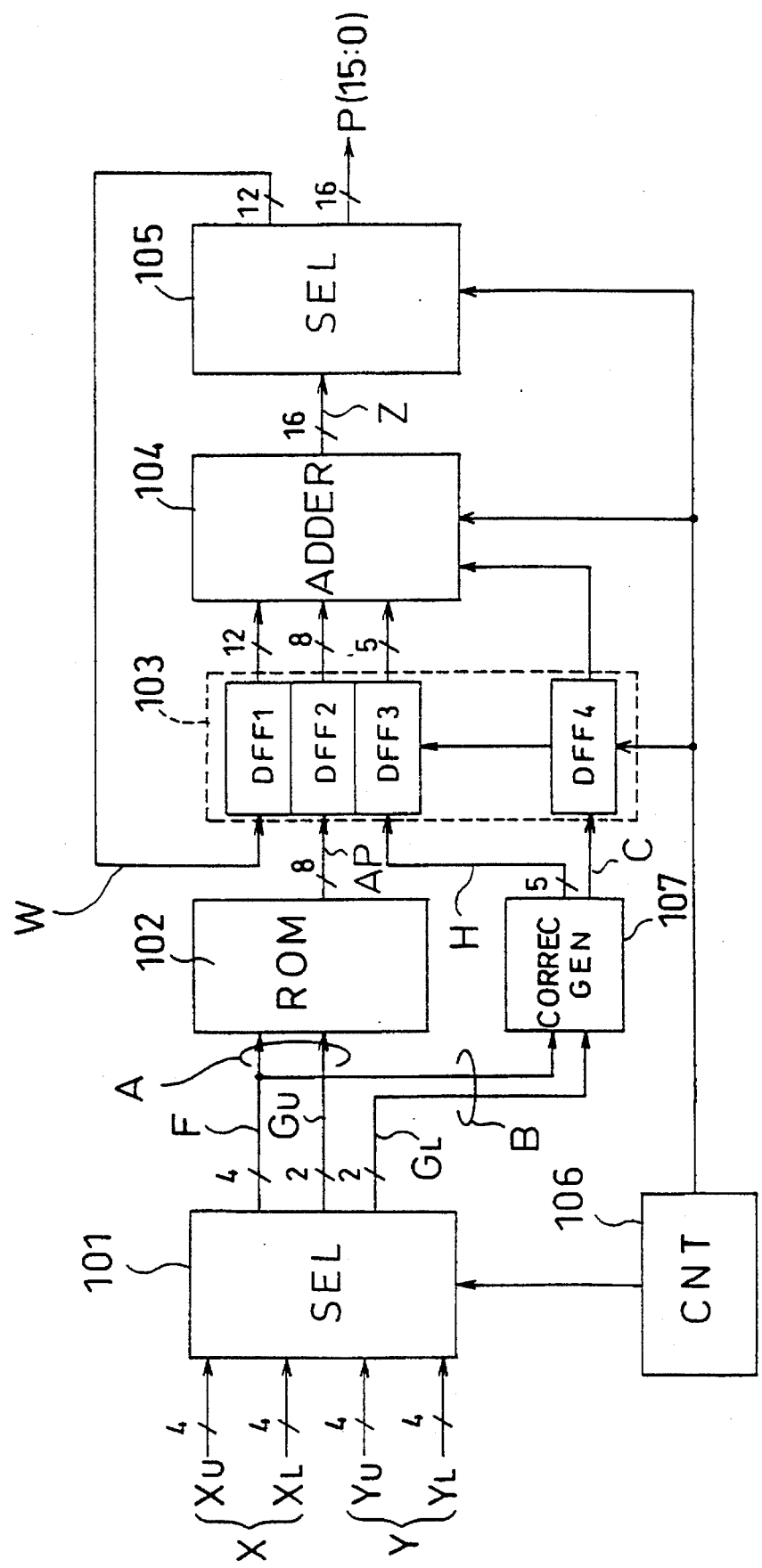
FIG. 3 illustrates a third multiplication device of the present invention.

FIG. 3 shows a third multiplication device of the present invention for finding a product P(15:0) of sixteen bits from a multiplicand X of eight bits and a multiplier Y of eight bits. Each of $X_U \times Y_U$, $X_U \times Y_L$, $X_L \times Y_U$, and $X_L \times Y_L$ (see the formula (3)) is computed using the ROM 102 and the generator 107 of FIG. 1. The storage capacity of the ROM 102 of the third multiplication device is 64 bytes, that is, the ROM storage capacity is reduced by the present embodiment to ¼ in comparison with the second prior art technique.

In addition to the ROM 102 and the generator 107, the third multiplication device of FIG. 3 has the following: a first selector 101, a latch 103 having four D-type flip-flops (DFF), an adder 104, a second selector 105, and a controller 106.

The selector 101 operates as follows. The selector 101 first chooses data of 8 bits made up of $X_L$ (multiplicand's low-order part) and $Y_L$ (multiplier's low-order part). Thereafter, the selector 101 chooses data of 8 bits made up of $X_L$ (multiplicand's low-order part) and $Y_U$ (multiplier's upper-order part). Then, the selector 101 chooses data of 8 bits made up of $X_U$ (multiplicand's upper-order part) and $Y_L$ (multiplier's low-order part). Finally, the selector 101 chooses data of 8 bits made up of $X_U$ (multiplicand's upper-order part) and $Y_U$ (multiplier's upper-order part). Each of these four 8-bit data items, sequentially chosen by the selector 101, is divided into the first data F of four bits, the second data $G_U$ of two bits, and the third data $G_L$ of two bits and is supplied to the ROM 102 and the generator 107. As a result, four APPROX PRODUCTS respectively corresponding to the four data items are sequentially retrieved from the ROM 102, while on the other hand the generator 107 sequentially generates four correction values (H) and four carries(C) respectively corresponding to the four data items. The first DFF of the latch 103 holds a sum of partial products, W, (hereinafter referred to as the intermediate sum). The second DFF holds AP (approx product). The third DFF holds H (correction value). The fourth DFF holds C (carry). The adder 104 executes digit place alignment addition of W held by the first DFF, AP held by the second DFF, H held by the third DFF, and C held by the fourth DFF, in order to compute a partial sum, Z. The adder 104 corresponds to the adder 110 of FIG. 1. The selector 105 applies, as an intermediate sum W, a partial sum Z of eight or twelve bits computed by the adder 104, to the first DFF of the latch 103 and provides a partial sum Z of sixteen bits computed by the adder 104 to outside the multiplication device, as a final product P of sixteen bits. The controller 106 controls the operations of the selector 101, the latch 103, the adder 104, and the selector 105.

With the third multiplication device of FIG. 3, an 8-bit partial sum $Z_1$ ($=X_L \times Y_L$), a 12-bit partial sum $Z_2$ ($=X_L \times Y_U \times 2^4 + X_L \times Y_L$), a next 12-bit partial Sum $Z_3$ ($=X_U \times Y_L \times 2^4 + X_L \times Y_U \times 2^4 + X_L \times Y_L$), and a 16-bit partial sum $Z_4$, or PRODUCT P of sixteen bits ($=X_U \times Y_U \times 2^8 + X_U \times Y_L \times 2^4 + X_L \times Y_U \times 2^4 + X_L \times Y_L$), are sequentially computed. Of these four partial sums the first three partial sums, i.e., $Z_1$, $Z_2$, and $Z_3$, are fed back to the adder 104 via the first DFF of the latch 103, as an intermediate sum W. The pipeline operation of the third multiplication device is implemented by the latch 103.

Additionally, for the case of ROUNDING OFF or ROUNDING UP of an 8-bit low-order part of PRODUCT P(15:0) of sixteen bits, the third multiplication device of FIG. 3 should include the rounding circuit 150, as in the second multiplication device of FIG. 2. However, the rounding bit R is determined according to the low-order part P(7:0) and a rounding product of eight bits is obtained.

FOURTH MULTIPLICATION DEVICE

Figure 4:
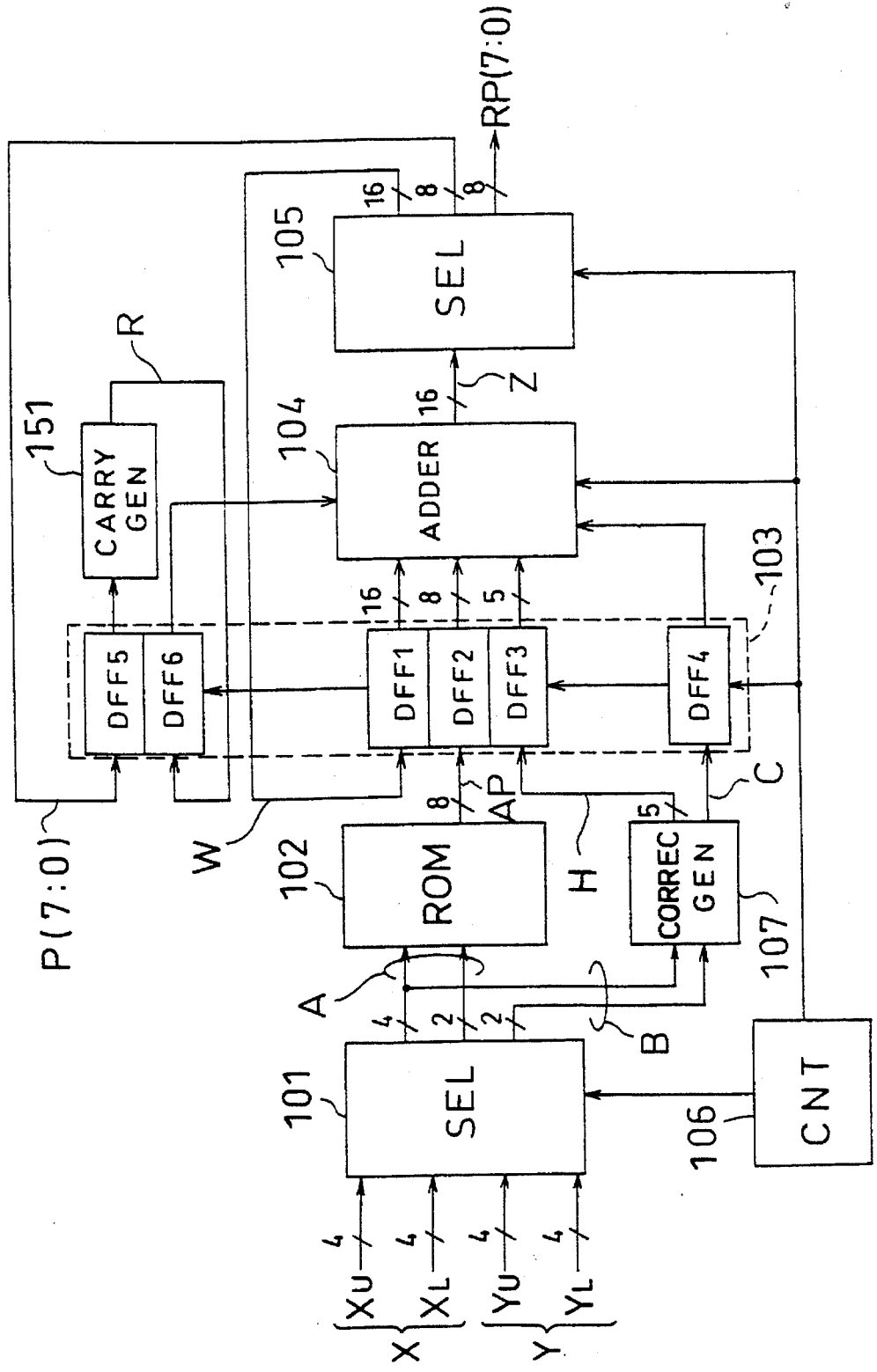
FIG. 4 illustrates a fourth multiplication device of the present invention.

FIG. 4 shows a fourth multiplication device of the present invention for finding a rounding product RP(7:0) of eight bits from a multiplicand X of eight bits and a multiplier Y of eight bits. The fourth multiplication device of FIG. 4 is a device as a result of adding the generator 151 of FIG. 2 to the configuration of FIG. 3. The adder 104 of the fourth multiplication device of FIG. 4 performs (i) synthetic addition of AP, H, and C, (ii) digit place alignment addition of $X_U \times Y_U$, $X_U \times Y_L$, $X_L \times Y_U$, and $X_L \times Y_L$, and rounding addition of $Z_4$ that is a 16-bit partial sum. The latch 103 has a fifth and a sixth DFF in addition to the four DFFs of FIG. 3.

When the adder 104 computes $Z_3$ that is a 12-bit partial sum, an 8-bit low-order part of $Z_3$ corresponds to an 8-bit low-order part P(7:0) of the final result (i.e., PRODUCT P of sixteen bits) and is fixed. The second selector 105 provides $Z_1$, $Z_2$, $Z_3$, and $Z_4$ sequentially computed by the adder 104 to the first DFF of the latch 103 as the intermediate sum W, and provides P(7:0), which is a fixed part of PRODUCT P, to the fifth DFF of the latch 103 when $Z_3$ of twelve bits is computed by the adder 104, and provides to outside the multiplication device an 8-bit upper-order part of a result of the rounding addition of $Z_4$ of sixteen bits by the adder 104. The generator 151 generates from P(7:0) held by the fifth DFF of the latch 103 a rounding carry R. In the case of ROUNDING OFF, the MSB P(7) of P(7:0) acts as a rounding carry R. In the case of ROUNDING UP, a logical sum of eight bits forming P(7:0) acts as a rounding carry R. Such a generated rounding carry R is applied to the adder 104 via the sixth DFF of the latch 103 when performing rounding addition.

In accordance with the fourth multiplication device of FIG. 4, $Z_4$ of sixteen bits is computed by the adder 104 from $Z_3$ of twelve bits concurrently with the generation of rounding carry R. As a result, RP (rounding product) can be obtained immediately after computing $Z_4$.

In each of the embodiments of the present invention, the multiplicand and the multiplier each are formed by four bits or eight bits; however, they may be formed by other numbers of bits. Additionally, in each embodiment of the present invention, when retrieving an approximate product or an approximate partial product AP from the ROM, G' (formal multiplier) is used which is obtained by fixing $G_L$ (a multiplier's low-order part of two bits) at logical 1. However, the fixed part may be formed by any number of bits and may be fixed at any logical value. For example, part of bits of MULTIPLICAND or parts of bits of MULTIPLICAND and MULTIPLIER may be fixed.

In each of the FIG. 3 multiplication device and the FIG. 4 multiplication device, each of MULTIPLICAND X and MULTIPLIER Y is divided into two blocks each of which is formed by four bits. However, they may be divided into any number of blocks formed by any number of bits.

The invention claimed is:
1. A multiplication device comprising:

means for storing a plurality of approximate products and for retrieving an approximate product from said stored plurality of approximate products corresponding to a first numeric and a part of a second numeric, said first numeric having a first plurality of bits and said second numeric having a second plurality of bits and a third plurality of bits, each said plurality of approximate products being stored according to an address having said first numeric merged with said second plurality of bits;

means for generating a correction value from said first numeric and said third plurality of bits;

means for computing a product of said first numeric and said second numeric by performing an addition operation of said retrieved approximate product and said generated correction value.

2. A multiplication device of claim 1 further comprising means for rounding said computed product.

3. A multiplication device of claim 2,
said rounding means including:
means for generating a rounding carry from a low-order part of said computed product;
means for computing a rounding product of said first numeric and said second numeric by performing a rounding addition operation of said computed product and said generated rounding carry.

4. A multiplication device of claim 1 further comprising:
means for dividing, in order to obtain plural partial products from a given multiplicand and a given multiplier, said given multiplicand and said given multiplier into said first numeric and said second numeric respectively;
means for computing a product of said given multiplicand and said given multiplier by performing a digit place alignment addition of said plural partial products.

5. A multiplication device of claim 4 further comprising:
means for temporarily holding said retrieved approximate product and said generated correction value together forming each said partial product.

6. A multiplication device of claim 4 further comprising a single adder for performing said synthetic addition operation and said digit place alignment addition operation.

7. A multiplication device of claim 4 further comprising means for rounding said computed product.

8. A multiplication device of claim 7,
said rounding means including:
means for generating a rounding carry from a low-order part of said computed product;
means for computing a rounding product of said multiplicand and said multiplier by performing a rounding addition operation of an upper-order part of said computed product and said generated rounding carry.

9. A multiplication device of claim 8 further including means for temporarily holding said generated rounding carry.

10. A multiplication device of claim 8 further comprising a single adder for performing said digit place alignment addition operation and said rounding addition operation.

* * * * *